A. E. GREENE.
ELECTRIC FURNACE.
APPLICATION FILED APR. 1, 1908.
1,021,187.
Patented Mar. 26, 1912.
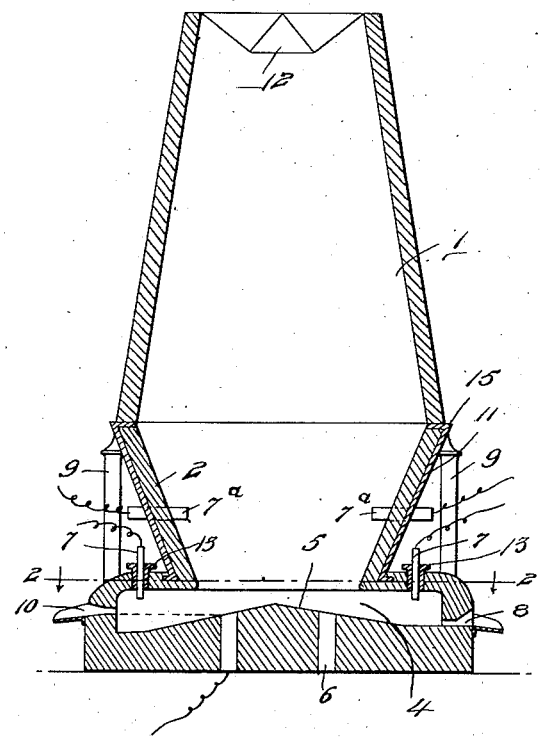
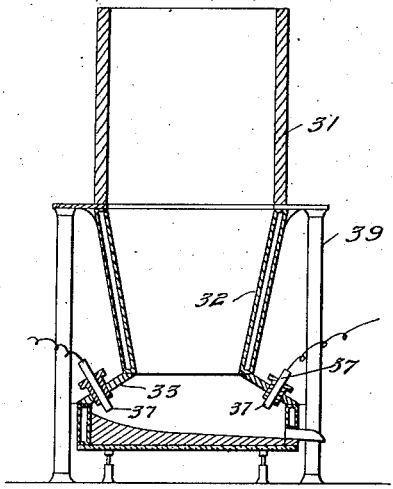
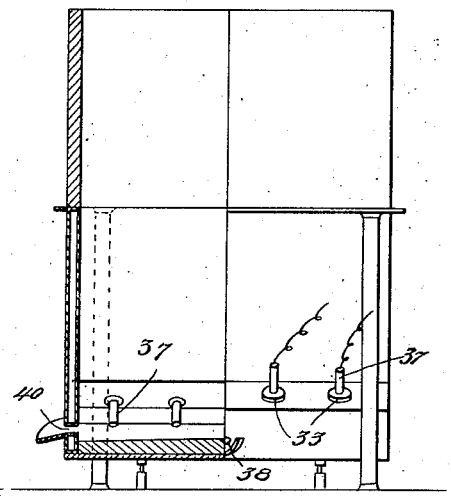
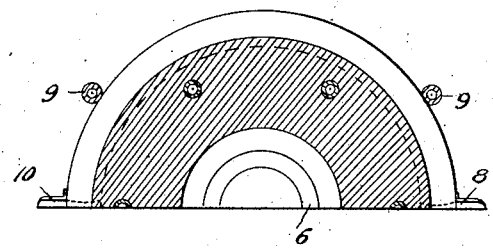
WITNESSES:
INVENTOR.
Albert E Greene
BY
Byrnes, Townsend & Brickenstein
ATTORNEY.

UNITED STATES PATENT OFFICE.

ALBERT E. GREENE, OF PUEBLO, COLORADO.

ELECTRIC FURNACE.

1,021,187.  Specification of Letters Patent.  Patented Mar. 26, 1912.

Application filed April 1, 1908. Serial No. 424,507.

*To all whom it may concern:*

Be it known that I, ALBERT E. GREENE, a citizen of the United States, residing at Pueblo, in the county of Pueblo and State of Colorado, have invented certain new and useful Improvements in Electric Furnaces, of which the following is a specification.

My invention relates to improvements in electric shaft furnaces for continuous reduction of ores and the object of my invention is to provide such a furnace with a bosh for sustaining the weight of the charge, and a smelting chamber beneath the bosh, in which the heat for reducing the charge can be electrically developed and applied in a particularly advantageous manner.

It is the further object of my ivention to so arrange such smelting chamber that the electrodes projecting thereinto are protected from contact with the unreduced charge, and to provide means for maintaining the level of the slag bath formed therein, so that the slag shall act as a resistor in a manner to be later described.

I attain these objects by the construction illustrated in the accompanying drawings in which—

Figure 1 is a sectional elevation of my furnace. Fig. 2 is a sectional plan view on the line 2—2 of Fig. 1. Fig. 3 is a sectional end elevation of a modified form of furnace and Fig. 4 a front view, partly in section of the form of furnace shown in Fig. 3.

The furnace shown in the accompanying drawings is intended for the continuous reduction and smelting of ores, and resembles in construction blast furnaces used for that purpose. Like such furnaces, it consists of a casing shaft forming a continuous chamber having a restriction or bosh near its end, which opens directly, in the nature of a feed hopper, into the upper central portion of a smelting chamber, the charge progressing continuously through the furnace as the material is fed in at the top and the metal withdrawn at the bottom, the upper portion forming a reducing chamber in which the oxid charge is heated by the gases rising from the smelting chamber and is reduced or partly reduced by the carbon in the charge, from which reducing chamber it passes directly into the smelting-chamber, the molten metal passing through the slag and collecting on the hearth.

Referring to Fig. 1, it will be seen that a masonry shaft 1 is supported on plates 15 carried by a series of columns 9. Converging downwardly from the bottom of the shaft 1 is a bosh, having walls 2, of refractory material which may be provided with a water jacket 11, or with separate water coolers as is common in blast furnace construction, or these water cooling devices may be entirely omitted.

Arranged directly beneath the bosh is a smelting chamber 4 whose roof extends outwardly, preferably in a horizontal direction from the bottom of the wall 2, and then downwardly to the hearth of the smelting chamber. In other words the roof of the smelting chamber extends outwardly as a flange about the lower end of the bosh. Free space is thus provided upon the exterior sides of the wall 2 for access to the roof of the smelting chamber, thus providing for the location of the electrodes in the manner hereinafter described. This roof is also composed of refractory material and is preferably water cooled. Extending downwardly through the roof are the electrodes 7, which may be vertically arranged or inclined, as shown in Fig. 3.

The electrodes, where they pass through the roof may be surrounded by a bushing 13 of insulating material.

The hearth of the furnace, which is also of refractory material, has a hearth 5, which may be upwardly inclined toward the center or substantially flat and is provided with an electrode 6, shown in Fig. 2 as annular, though obviously a series of electrodes may be substituted for this single electrode. In the side wall of the smelting chamber is provided a slag opening 10, which is slightly below the level of the top of the electrode 6. A metal tap opening 8 is also provided, the hearth at the metal tapping side being somewhat lower than elsewhere. The outer peripheral portion of the hearth forms an annular conduit, the size of which is so proportioned as to determine to a certain extent the quantity of current carried by the molten metal contained therein under the slag. I prefer to use either a single phase or multiphase alternating current, although a direct current may be used.

If a single phase current be used, the outer electrodes are connected to one side of the circuit, and the central electrode or electrodes to the other.

When polyphase currents are used, the central electrode in the hearth is connected to the neutral point of the system, the current then flowing from the outer electrodes to the central one, but also between the outer electrodes themselves.

Figs. 3 and 4 show another type of furnace suitable for reducing, not only iron ore but ores of copper and lead not requiring for their reduction such high temperatures. This furnace differs from that shown in Figs. 1 and 2 in that no electrodes are used in the hearth, which is preferably of the shape shown. The masonry shaft 31, is supported on pillars 39, and is provided with a bosh 32, which may be of water-cooled metal with or without a refractory lining, or may be made of refractory material alone. Through the upper wall or roof 33 of the smelting chamber project the electrodes 37, surrounded by refractory non-conducting bushings 33 to prevent short-circuiting of the current through the metal jackets. A metal tap hole 38, and a slag tap hole 40 are provided as shown. Furnaces of this type are preferably operated by alternating currents. While the furnace shown is rectangular in cross section, it may, of course, be round or polygonal in shape.

The mode of operation is as follows: The iron or other oxid ore, mixed with the required proportion of carbon and a suitable flux is fed into the furnace through the charging bell 12, as in iron blast furnaces. As the charge descends it is heated and reduced by the ascending gas. At the lower end of the shaft its passage into the smelting chamber is restricted by the bosh. The charge, resting partly upon the bosh and partly upon the hearth, is held in close proximity to the slag bath, into which the electrodes project, the layer of slag acting as a resistor, the passage of the current through the slag and metal producing the heat requisite for the reduction of the charge, and the melting of the reduced metal. The molten metal flows downward through the slag into the hearth. By the combination of a bosh with the subjacent smelting chamber, the charge is prevented from falling into the smelting zone, and thus displacing the slag bath. It is therefore possible to keep under control the level and depth of the slag bath by tapping from time to time the slag or metal. By this arrangement, further, the charge is prevented from displacing the slag and causing it to rise so high as to reach the roof of the smelting chamber or the points where the electrodes pass therethrough, where the congealing of slag about the electrodes would prevent their movement. The electrodes which are preferably of carbon, do not come into contact with the unreduced charge or with the decarburized iron therein, and there is therefore no waste of electrode material by oxidation thereof and no recarburization of the metal by the carbon electrode. However, the electrodes, which are longitudinally adjustable, may extend more or less into the slag bath as desired. The temperature of the smelting zone is controlled by varying the voltage between the electrodes as described in my application, Ser. No. 397,567, filed October 15, 1907. By maintaining the slag bath at the proper temperature, and of the proper composition, the quality of the product may be easily and accurately controlled. If an arc is desired, this can readily be obtained by raising the electrode out of the slag bath to the proper distance. The molten metal is tapped through the metal tap hole 8. If additional heat is desired, electrodes 7ᵃ may be inserted through the walls of the bosh, and used in combination with those in the hearth below.

I claim:

1. In an electric furnace, the combination with a heating chamber, of a shaft having a bosh at the lower end thereof communicating with said heating chamber through the top thereof, said chamber being organized to provide a free space between the charge and the top of said heating chamber when the charge is introduced into the lower portion of the shaft and into said heating chamber, and electrodes extending through the wall of said chamber into said free space.

2. An electric furnace comprising a shaft the lower end of which is constricted to form a bosh, a heating chamber in which said bosh terminates centrally of said chamber, said chamber having roof walls extending outwardly from said bosh, whereby the charge is prevented from filling said chamber, and electrodes extending through said roof into the free space within said chamber.

3. In an electric furnace, the combination with a shaft having a bosh at the lower end thereof, a heating chamber into which said bosh opens, said heating chamber having a roof extending outwardly as a flange about the lower end of said bosh to provide a free space between the charge and said roof and electrodes extending downwardly through the roof into said free space, whereby the heat generated by the current from the electrodes may be transmitted directly to the charge in the shaft.

4. An electric furnace comprising an electric smelting chamber provided with electrodes and a shaft arranged on the said chamber and communicating with the same, the shaft being formed to expand upward and the smelting chamber to expand downward from the part through which said chamber and the shaft communicate with each other, the interior of the smelting chamber being so formed that free space always exists between the walls of said chamber and the charge, and the electrodes being arranged to project from the walls of said chamber through said free space.

5. In an electric furnace, the combination of a shaft having a bosh at the lower end thereof, a smelting chamber beneath the bosh, electrodes in the walls of the smelting chamber, a hearth upwardly inclined toward the center and an annular electrode in its upwardly inclined portion, means for protecting the electrodes from contact with the unsmelted charge and means for maintaining the level of the slag bath in the smelting chamber.

6. An electro-metallurgical furnace comprising a crucible having an arched roof with contracted throat, said arch presenting, in respect to the horizontal, an angle less than the angle of repose of the charge passing downwardly from the contracted throat, whereby a gas chamber is formed between the charge and said arched roof, insulated electrodes crossing said gas chamber, and a furnace surmounting the crucible and consisting of a stack with bosh communicating with the contracted throat in the roof of the crucible.

7. An electro-metallurgical furnace comprising a crucible having an arched roof with contracted throat, said arch presenting an angle less than the angle of repose of the charge passing downwardly from said throat, so as to form a gas chamber between the charge and the roof of the crucible, insulated electrodes crossing said gas chamber, and a furnace surmounting the crucible and consisting of a stack with bosh communicating with the contracted throat in the roof of the crucible.

In testimony whereof, I affix my signature in presence of two witnesses.

ALBERT E. GREENE.

Witnesses:
 GEO. E. GENETT,
 CHAS. H. POTTER.